United States Patent Office 3,298,787
Patented Jan. 17, 1967

3,298,787
COLOR PREGNANCY TEST
Eric T. Fossel, New Haven, Conn., assignor to Unimed, Inc., Morristown, N.J., a corporation of Delaware
No Drawing. Filed Sept. 11, 1964, Ser. No. 395,950
7 Claims. (Cl. 23—230)

This application relates to color pregnacy tests, and more particularly to tests to determine whether or not a female animal, and particularly a woman, is pregnant by chemical means whereby the indication of pregnancy or non-pregnancy constitutes an observable color reaction.

Numerous tests for determining the pregnancy of female animals, and particularly women, and, for the purposes of this application and simplicity of discussion, reference will always be made to women, although it is to be understood that the applications refers to pregnancy tests which can be used for other female animals, are well known. The most famous pregnancy test is the test carried out on AZ-rabbits to indicate whether or not the woman is pregnant. In this test the animal is injected with the urine of the woman who is suspected of being pregnant, and several days later the animal is killed and the ovaries thereof examined to determine whether hemorrhagic spots have developed, which would indicate pregnancy of the woman. Actually, the well known AZ test is carried out on mice, and it is the modification thereof by the Friedman test which uses rabbits.

One of the disadvantages of all the known pregnancy tests is that the same are relatively expensive because they require the killing of animals which have to be raised especially for the tests, and in addition to the expense thereof, the tests are relatively expensive because of the time involved and the need for skilled technicians to carry out the tests. Furthermore, the known tests suffer from the disadvantages of requiring relatively long periods of time—one day to several days—before an answer can be given.

In my co-pending application, Serial No. 351,837, filed March 13, 1964, for "Pregnancy Test," I described a method of determining whether or not a woman is pregnant by contacting the woman's urine with a compound which forms an insoluble compound with the magnesium ions of chorionic gonadotropin, the formation of a precipitate upon such contacting indicating that the woman is pregnant, while no precipitate indicates that the woman is not pregnant.

This invention relates to a further development whereby the indication of whether or not the woman is pregnant is achieved by a color reaction instead of by a precipitate.

It is accordingly a primary object of the present invention to provide a purely chemical pregnancy test, that is a test which does not rely at all on animals and which is simply accomplished by the mixing of chemicals with the urine of the woman who is suspected of being pregnant, and which indicates the pregnancy or non-pregnancy by a color reaction.

It is another object of the present invention to provide a simple chemical pregnancy test which can be carried out even by the unskilled layman, and which gives results with accuracies at least equal to and generally better than those obtainable with known pregnancy tests.

It is yet another object of the present invention to provide a purely chemical pregnancy test which within a very short time, as little as a minute or two, and by means of a color reaction, can give an answer to the question of whether or not the woman is pregnant.

Other objects and advantages of the present invention will be apparent from a further reading of the specification and of the appended claims.

With the above and other objects in view, the present invention mainly comprises a method of determining whether or not a female animal, and particularly a woman, is pregnant, which comprises contacting the female's urine with a chelating agent for chelated magnesium of chorionic gonadotropin and with an indicator which changes color within the pH range of about 7.0 to 9.0, whereby a color change within this pH range indicates that the female is pregnant, and no color change within this pH range indicates that the female is not pregnant.

The most preferred chelating agents for the purposes of the present invention are the dicarboxylic, tricarboxylic, tetracarboxylic and pentacarboxylic acids of low molecular weight, or salts thereof on one or all of the carboxylic acid groups which easily form soluble sodium or potassium salts. The most preferred chelating agents are the salts of ethylenediamine tetra acetic acid such as the disodium or dipotassium salts thereof.

Any indicator which gives a color change in the pH range of about 7.0 to 9.0 can be used for the purposes of the present invention. Among the preferred indicators for this purpose are alpha-naphthophthalein, cresol red, cresol purple, thymol blue, xylol blue, and alpha-naphtholbenzein.

The test is preferably carried out by adding the chelating agent and the indicator which changes color in the range of pH 7.0 to 9.0 to the urine being tested, using a predetermined amount of the chelating agent, and then titrating the resulting urine-chelating agent solution with a strong base. A change in color either prior to the addition of the strong base (which would indicate no magnesium ions being present and consequently an immediate increase will result from the chelating agent which itself is a strong base), or by the addition of less than the amount of the strong base necessary to release the theoretical amount of magnesium ions which can be chelated by the predetermined amount of the chelating agent (which indicates an insufficient amount of magnesium ions in the solution to chelate all of said chelating agent) constitutes a negative test, i.e., the female is not pregnant, whereas a color change occurring only after the addition of more than the amount of strong base necessary to release the theoretical amount of magnesium ions that could be bound by the predetermined amount of the chelating agent indicates a positive test, i.e. the female is pregnant.

Any strong base, preferably in the form of a concentrated solution, can be used for the titration. The strong base may be an organic or inorganic base (in the Lewis sense), such as sodium hydroxide, potassium hydroxide, lithium hydroxide, ammonium hydroxide, ammonium salts, amides, cyanides, etc. Of course, sodium hydroxide is the most preferred for reasons of economy and ready availability.

Although the present invention is not meant to be limited as to any theory as to how or why the same will give an indication as to whether or not the female is pregnant, the following theory is given in the hope that it will help other investigators in this field.

It is believed that during pregnancy the woman will excrete chorionic gonadotropin in her urine, and that chorionic gonadotropin includes chelated metal ions, particularly magnesium ions. The admixture, therefore, of the female urine with a chelating compound such as disodium, ethylene-diamine tetra acetic acid will therefore form a chelate with any such chelated magnesium ions, and as a result of this chelation, the color indicator which is also added, and which will change color in pH range 7.0 to 9.0, will not change color despite the strongly basic character of the chelating agent, until a sufficient amount of a strong base is added to release the chelating agent and ion from the chelated magnesium ions, which release is accompanied by a sharp rise of pH. Consequently, if the sharp rise of pH, with the accompanying color change, does not occur before the addition of a sufficient amount of the strong base to release the theoretical amount of chelated magnesium, then the woman is pregnant, whereas if the color change occurs simply upon the addition of the chelating agent with the color indicator, or by the addition of less than the theoretical amount of strong base, this is an indication that the chorionic gonadotropin chelated magnesium is not present, and consequently that the woman is not pregnant.

Hundreds of tests have been carried out on urine samples, and it has been found that this test will give a greater degree of accuracy than can be obtained with known pregnancy tests carried out with rabbits, mice, frogs, etc. As in the case of other pregnancy tests, the pregnancy test of the present invention is most accurate during the second and third months of pregnancy.

The relationship of the amount of urine to the amount of chelating agent can be adjusted as desired, the only result of changes of such concentrations from the preferred concentrations which are set forth in the examples, being with respect to the change in the amount of the strong base added which is necessary to be reached before the test can be considered as positive.

The chelating agent is preferably added in the form of a solution, the concentration of which is limited only by the solubility of the chelating agent salt, and it is most preferred that the pH of the solution of the chelating agent be adjusted to about 8.

As indicated above, the strong base which is used for the titration is preferably used in the form of a soltuion, and a soltuion of any base having a pH value above about 10.0 is satisfactory. It is most preferred to use an aqueous solution of sodium hydroxide having a pH value of about 12.5.

The following example is given to further illustrate the present invention. The scope of the invention is not, however, meant to be limited to the specific details of the example.

*Example*

0.8 cc. of urine of the suspected pregnant is introduced into a narrow diameter test tube.

To this urine is added 0.6 cc. of solution A and then 0.2 cc. of solution B.

There is then added drop-wise, while counting the drops, solution C.

Solution A=10 g. of ethylenediamine tetra acetic acid disodium salt in 250 ml. water with a pH adjusted with NaOH to 8;
Solution B=200 mg. of alpha-naphthophthalein per 100 cc., 50:50 ethanol and water;
Solution C=pH 12.5 solution of sodium hydroxide.

If the urine solution turns blue-green on the addition of solution B, or on the addition of 1–7 drops of solution C, the test is negative. If the solution turns blue-green after adding 8 or more drops of solution C, then the test is positive.

The same results can be obtained by the substitution for the ethylenediamine tetra acetic acid disodium salt of any other equivalent magnesium chelating agent such as dipotassium acid, ammoniatriacetate. Any indicator giving a color reaction within the pH range of 7.0 to 9.0 can be substituted for the alpha-naphthophthalein with like results. In addition, any strong organic or inorganic base can be used in place of the sodium hydroxide.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of determining whether or not a female animal is pregnant, which comprises contacting the female animal's urine with a chelating agent which will chelate with chelated magnesium of chorionic gonadotropin, and with a color indicator which changes color in pH range of about 7.0–9.0 upon release of chelated magnesium from said chelating agent, so that upon titration with a strong base, the requirement of an amount of base necessary to release the theoretical amount of chelated magnesium which could be chelated by said chelating agent before a color change occurs indicating that the female is pregnant, whereas a lesser amount of base producing the change of color indicates that the female is not pregnant.

2. Method according to claim 1 in which the chelating agent is a low molecular weight polycarboxylic acid.

3. Method according to claim 1 in which the chelating agent is ethylenediamine tetra acetic acid.

2. Method of determining whether or not a female animal is pregnant, which comprises contacting the female animal's urine with a predetermined amount of a chelating agent which will chelate with a chelated magnesium of chorionic gonadotropin and with a color indicator which changes color in the range of pH 7.0 to 9.0, and titrating the resulting mixture with a strong base, whereby a change in color prior to the addition of a sufficient amount of said strong base to release the total amount of chelated magnesium that could be chelated by said predetermined amount of said chelating agent indicating that the female animal is not pregnant, whereas the requirement of at least an amount of strong base necessary to release all of the chelated magnesium that could be bound by said chelating agent in order to obtain a color change indicating that the female animal is pregnant.

5. Method according to claim 1 in which said chelating agent is a low molecular weight polycarboxylic acid.

6. Method according to claim 4 in which said chelating agent is ethylenediamine tetra acetic acid.

7. Method of determining whether a female animal is pregnant, which comprises adding to the equivalent of about 0.8 cc. of urine a chelating agent for chelated magnesium of chorionic gonadotropin in an amount equivalent to about 0.6 cc. of a solution of 10 g. of ethylenediamine tetra acetic acid disodium salt in 250 cc. of water with pH thereof adjusted to about 8, and a color indicator which changes color in pH range 7.0 to 9.0, and titrating the resulting mixture with a strong base in a solution equivalent to an aqueous solution of sodium hydroxide at pH 12.5, whereby a change in color of the mixture before the addition of 8 drops of said strong base indicates that the female animal is not pregnant, and a change of color of the mixture resulting upon the addition of at least 8 drops of the base indicating that the female animal is pregnant.

References Cited by the Examiner

UNITED STATES PATENTS

| | | | |
|---|---|---|---|
| 2,564,247 | 8/1951 | Carson et al. | 23—230 |
| 2,587,221 | 2/1952 | Richardson et al. | 23—230 |
| 3,226,196 | 12/1965 | La Vietes | 23—230 |
| 3,236,732 | 2/1966 | Arquilla | 167—84.5 |
| 3,248,173 | 4/1966 | Stauch | 23—230 |

OTHER REFERENCES

Hawk, Practical Physiological Chemistry, 1954, p. 788.
Roth, U.S. Armed Forces Medical Journal, vol. V, No. 1, January 1954, pp. 83–85.
Welcher, The Analytical Uses of Ethylenediamine Tetraacetic Acid, D. Van Nostrand, 1961, pp. 12–13, paragraph (d).

MORRIS O. WOLK, *Primary Examiner.*

Z. PAROCZAY *Assistant Examiner.*